US007784071B2

(12) United States Patent
Vince et al.

(10) Patent No.: US 7,784,071 B2
(45) Date of Patent: Aug. 24, 2010

(54) METHOD AND APPARATUS FOR LINKING A PLURALITY OF USER DEVICES TO A SERVICE LOCATION

(75) Inventors: Lawrence D. Vince, Lansdale, PA (US); Raymond C. Bontempi, Jamison, PA (US); Arthur P. Jost, Mount Laurel, NJ (US)

(73) Assignee: General Instrument Corporation, Horsham, PA (US)

( * ) Notice: Subject to any disclaimer, the term of this patent is extended or adjusted under 35 U.S.C. 154(b) by 1028 days.

(21) Appl. No.: 11/142,821

(22) Filed: Jun. 1, 2005

(65) Prior Publication Data
US 2006/0277566 A1  Dec. 7, 2006

(51) Int. Cl.
*H04N 7/16* (2006.01)
(52) U.S. Cl. .............................. 725/30; 725/31; 725/119; 380/200
(58) Field of Classification Search ................... 725/30, 725/31, 87, 88, 95, 82, 119, 120, 127; 380/200
See application file for complete search history.

(56) References Cited

U.S. PATENT DOCUMENTS

| 5,675,647 | A | * | 10/1997 | Garneau et al. | 380/239 |
| 6,058,476 | A | * | 5/2000 | Matsuzaki et al. | 713/169 |
| 6,253,375 | B1 | * | 6/2001 | Gordon et al. | 725/88 |
| 6,424,714 | B1 | * | 7/2002 | Wasilewski et al. | 380/200 |
| 2006/0195862 | A1 | * | 8/2006 | Olcen | 725/22 |

* cited by examiner

*Primary Examiner*—Scott Beliveau
*Assistant Examiner*—Alan Luong
(74) *Attorney, Agent, or Firm*—Stewart M. Wiener

(57) ABSTRACT

A method for enabling at least one of a plurality of user devices to provide a service flow is described. In one example, a code is transmitted to a home identification device (HID) to be combined with an HID identification number. The combined response, which is comprised of the code and the HID identification number, is then transmitted from the HID and received by the user device(s). If the combined response is equivalent to at least one predetermined match key, which is stored in the user device(s), that user device(s) provides the service flow to a respective television(s).

19 Claims, 3 Drawing Sheets

100

METHOD AND APPARATUS FOR LINKING A PLURALITY OF USER DEVICES TO A SERVICE LOCATION

BACKGROUND OF THE INVENTION

1. Field of the Invention

Embodiments of the present invention generally relate to information transmission networks, and more particularly, to a method and apparatus for linking a plurality of user devices to a single service location.

2. Description of the Related Art

Traditionally, with all the digital rollouts and retail settop boxes that are subsidized by a multiple systems operator (MSO), a problem that has been identified in the past is coming back to light. In the event an MSO has to provide more than one settop box to a service location (e.g., a subscriber residence), the extra settop boxes are typically configured to receive the same set of services as the primary settop box. Additionally, these additional settop boxes are typically provided to the subscriber at a discount. Occasionally, some consumers are tempted to take delivery of two or more settop boxes and subsequently share those devices, as well as the cost of the subscribed services, with other non-subscribing residences. In the past, this dilemma was remedied in part by implementing master/slave settop boxes. Because these settop boxes are tied together through signaling over the cable or by a secondary connection (such as a twisted pair line), the slave settop box cannot function unless it is positioned in near the master settop box since the two devices must be connected. However, this master/slave configuration as well as the extra cabling that may be required can limit the effectiveness of tying a settop box to a single residence.

Therefore, there is a need in the art for a method and apparatus for linking a plurality of user devices (e.g., settop boxes) to a single service location.

SUMMARY OF THE INVENTION

In one embodiment, a method for enabling at least one of a plurality of user devices to provide a service flow is described. More specifically, a code is transmitted (e.g., by settop boxes) to a home identification device (HID) to be combined with an HID identification number. The combined response, which is comprised of the code and the HID identification number, is then transmitted from the HID and received by the user device(s). If the combined response is equivalent to at least one predetermined match key, which is stored in the user device(s), that user device(s) is permitted to provide the service flow to a respective display device(s).

In a second embodiment, a configuration code that assigns a user device identification number and provides at least one match key is received. A code from a home identification device (HID) in accordance to said user device identification number is subsequently received (e.g., by a settop box). Lastly, a service flow is provided to the at least one display device (e.g., from the settop box) if said code is equivalent to said at least one match key.

In a third embodiment, a home identification device (HID) identification number is received (e.g., by a settop box). The HID identification number and a user device code are then combined to form a combined code. Afterwards, the combined code is transmitted (e.g., by the settop box) to a headend, wherein the headend processes the combined code to determine if a service flow will be provided/continued to the at least one display device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
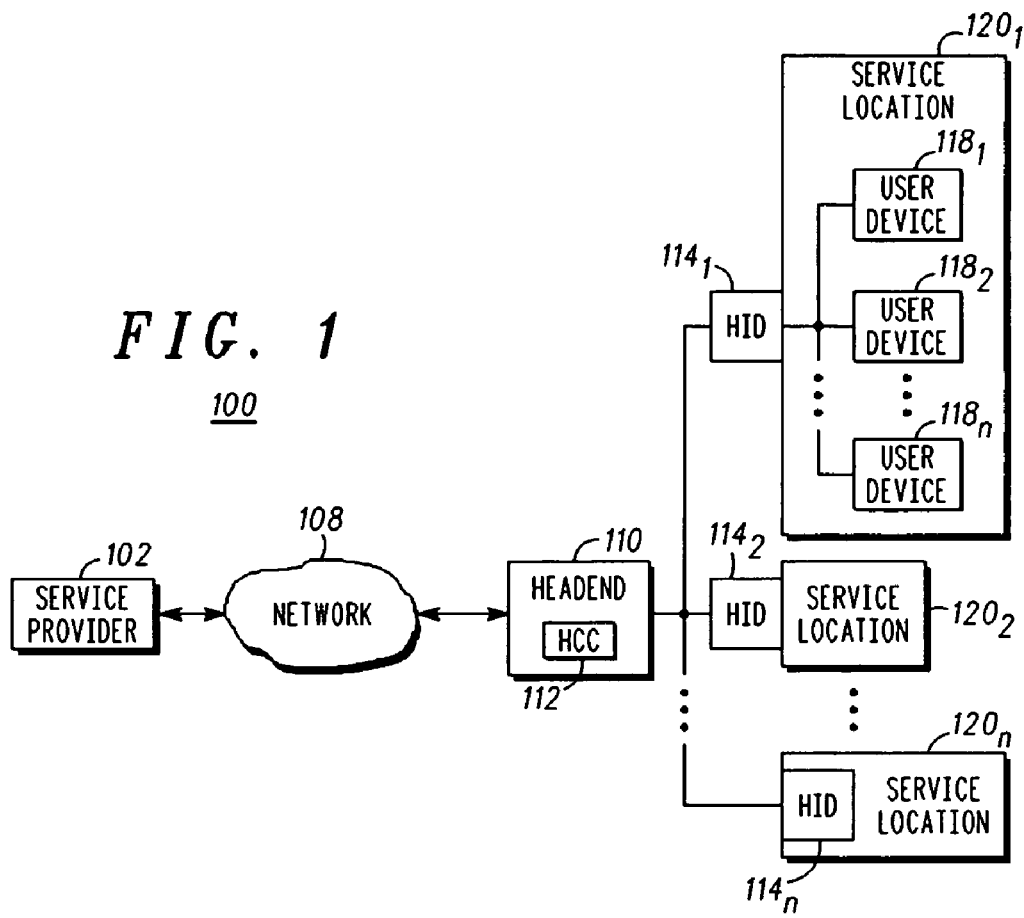
FIG. 1 is a block diagram of a general embodiment of a network system employing the principles of the present invention.

FIG. 1 depicts a network system 100 in which the embodiments of the present invention may be utilized. This figure only portrays one variation of the myriad of possible system configurations. For example, FIG. 1 could have depicted several headends and a plurality of service providers. For simplicity and clarity, only one headend 110 and one service provider 102 are depicted and described. The invention, as shall be discussed below, is a method and apparatus for linking a service location (e.g., a home or residence) to a particular user device, such as a conventional settop box.

The network 100 comprises at least one service location 120, that is supported by a corresponding Home Identification device (HID) 114. The HID 114 is coupled to a headend 110 and at least one settop box (STB) $118_{1...n}$. In one embodiment, the headend 110 is connected to at least one service provider 102 (e.g., a voice services provider, data services provider, etc.) through a communication network 108 (e.g., the Internet). In one embodiment, the headend 110 may be coupled to the service provider 102 through a direct connection and/or via the communication network 108.

The service location 120 is typically a residence, but may be any area or building that is supported by an HID 114. The service location 120 typically contains a plurality of user devices, such as personal computers (PCs) or settop boxes $118_{1...n}$. Depending on the embodiment, the HID 114 may be positioned inside the service location (as depicted by HID $114_n$), attached to the outside of the service location (as depicted by HID $114_1$), or built into the tap near the service location, such as mounted on a pole or placed underground (not shown). If the HID 114 is built into the tap in order to service more than one service location, the HID 114 will employ unique data for each drop. Every HID has a unique device identifier that is known to the headend 110. By utilizing this unique device identifier, the headend 110 (specifically, the headend computer controller (HCC) 112) may initialize the appropriate STBs and link them to a particular HID 114.

The settop box 118 may be an end-user or cable service subscriber electronic device that is connected to a communications channel (e.g., phone, ISDN, cable television line, etc.) and produces output on a display device (e.g., a conventional television screen, monitor, projection television, and the like). Specifically, one embodiment of the settop box 118 may be an apparatus similar to the Motorola DCT2500 or the Scientific-Atlanta EXPLORER 8000. The settop box 118 is typically connected to a cable operator RF feed and drives a corresponding display unit or television set (not shown). The video segments may be received via a packet stream (e.g. Moving Picture Experts Group (MPEG) Transport Stream or video-over-IP) or as analog video.

The headend 110 may be any physical site where modulation, demodulation, and processing (controlling, monitoring, etc.) equipment is kept and operated. The headend 110 typically comprises a master facility that receives television signals for processing and distributing over the network system 100. In one embodiment, the headend 110 is a building or large structure that contains electronic equipment used to receive and re-transmit video over the network system 100. In one embodiment, a headend computer controller (HCC) (e.g., a digital addressable controller (DAC)) 112 resides within the headend 110. The HCC 112 is a component that communicates with the HIDs and STBs positioned downstream. In one embodiment, the HCC 112 is able to manage and monitor all of the HID devices connected to the headend 110 since the HID devices transmit codes (or unit ID numbers) to the HCC 112 through the set top boxes for identification purposes. The HCC 112 is also familiar with the algorithms utilized by an HID to mask or encrypt the transmitted codes. Due to the relationship between the HCC 112 and HIDs, the HCC 112 is capable to download the appropriate HID information to pertinent STBs so that it can effectively "marry" or link the devices together.

Figure 2:
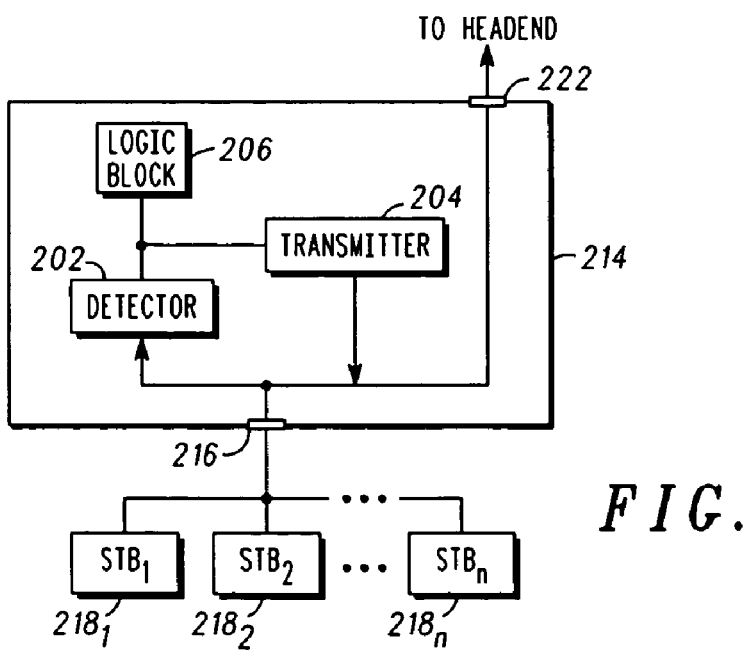
FIG. 2 depicts a block diagram of one embodiment of an HID coupled to a plurality of user devices in accordance with the present invention.

FIG. 2 depicts a block diagram of one embodiment of the HID system, which comprises an HID 214 and a plurality of user devices 218. The HID 214 comprises, but is not limited to one or more of the following devices: a transmitter 204, a detector 202, and a logic block 206. The detector 202 is the HID component responsible for obtaining codes from a settop box. Depending on the embodiment, a detector 202 may or may not be needed. The transmitter 204 is used to issue responses to the settop boxes $118_{1...n}$. The logic block 206 is the HID component that converts codes into responses. The HID is also equipped with an upstream port 222 and a downstream port 216.

The downstream port 216 of the HID 214 allows a plurality of user devices (e.g. settop boxes $118_{1...n}$) to be connected to and communicate with the HID 214. In one embodiment, the HID 214 may communicate with a STB by using baseband signaling over cable (although special splitters may be required). Alternatively, a simple AM or FSK signal may be utilized. Similarly, a band limited AM modulation of signals may be utilized.

Figure 3:
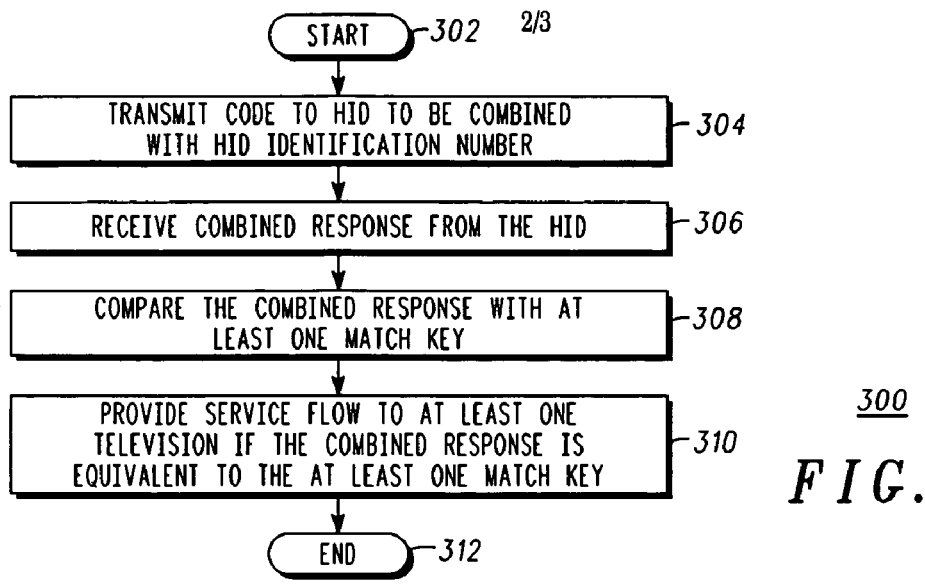
FIG. 3 is a flow diagram of a method for linking a plurality of devices to a service location in accordance with the present invention.

FIG. 3 depicts a flow diagram of a method 300 executed by one embodiment of the present invention. This embodiment involves the system being configured to function in a bidirectional assert/response manner where each user device (e.g., STB) sends a code to the HID via the downstream port 216. The method 300 commences at step 302 and proceeds to step 304, where a code is transmitted to an HID to be combined with an HID identification number. In one embodiment, a user device, such as a settop box, transmits a code to the HID for combination. The transmitted code may be the address of the settop box or may comprise a value previously downloaded from the HCC 112. After receiving the code, the HID combines the code with a unique identification value (e.g., an HID identification number) related to the HID's identity. In one embodiment, various cryptographic techniques may be employed to secure the transmitted code from a settop box to the HID.

At step 306, the combined response (e.g., a verification signal) is received from the HID. In one embodiment, the HID (via the transmitter 202) sends the combination of the code and unique identification value to the appropriate STB (e.g., the STB that originally sent the code), which promptly receives it.

At step 308, the combined response is compared with at least one match key. In one embodiment, the STB subsequently compares the combined code (e.g., an alphanumeric code) that was previous received in step 306 to an expected value (e.g., a match key). A match key is typically a predetermined number that is provided to the STB at some earlier time and may be stored in a database or in memory of the STB.

At step 310, a service flow is provided to at least one display device if the combined code matches the match key. A service flow may be defined as the provisioning of a content stream that may comprise audio data, visual data, multimedia data, and the like. In one embodiment, the STB utilizes a processor to compare the received combined response with the stored match key. Only if the two values are identical will the STB permit service to flow to an associated television or display unit. However, if the combined code does not match the expected response value, the STB will prevent the reception of service. Similarly, if the correct response is not received in a predetermined period of time, the STB will not provide service flow to the television in one embodiment. The method 300 then continues to step 312 and ends.

Figure 4:
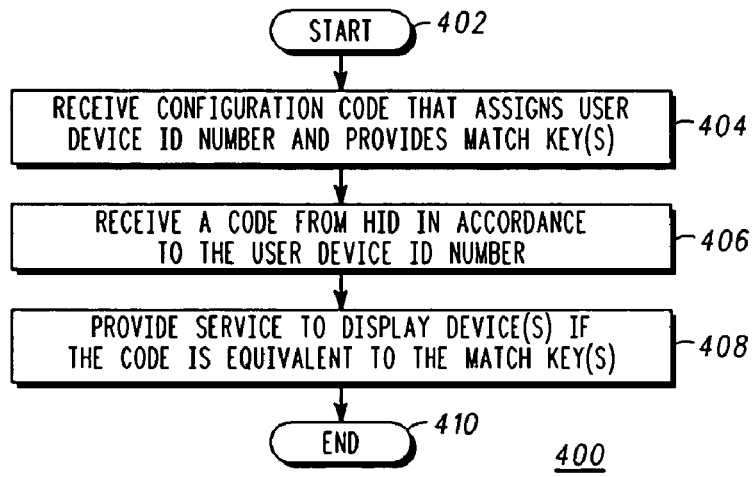
FIG. 4 is a flow diagram of a second method for linking a plurality of devices to a service location in accordance with the present invention.

FIG. 4 depicts a flow diagram of a method 400 executed by one embodiment of the present invention. This embodiment involves the system being configured to function in a unidirectional manner where an HID sends a plurality of codes to a respective plurality of user devices (e.g., settop boxes) via the downstream port 216. The method 400 commences at step 402 and proceeds to step 404, where a configuration code (which may or may not be cryptographically secured) that assigns a user device identification number as well as providing at least one match key is received. In one embodiment, the HCC 112 at the headend 110 provides the STBs with an HID identification number or code that each STB is expected to receive. The STB then stores this number as a match key in a database or memory. Similarly, the settop boxes, $STB_1$, $STB_2$, and $STB_3$, are uniquely identified by receiving a respective STB ID number (e.g., 1, 2, and 3) sent by HCC 112. These STB ID numbers are designated in a manner that associates STBs to a corresponding HID that is managed by the HCC 112.

At step 406, a code (e.g., a verification signal) is received from an HID in accordance to the user device identification number. In one embodiment, the HID 214 transmits a series of codes numbered 1, 2, and 3 which are received by $STB_1$, $STB_2$, and $STB_3$, respectively. Because the codes produced by the HID are intended specifically for these particular settop boxes, any foreign or unauthorized settop box will not function upon receiving a code. Notably, these HID codes are unique to the HID device. Each STB then compares the HID identification number it received from HID 214 with the stored match key(s).

At step 408, a service flow is provided to the display device(s) if the received code is equivalent to the match key(s). In one embodiment, if the identification number matches the expected response value (e.g., the match key stored in a database or memory), then the STB will allow service to flow through to an associated television or display device. However, if the code does not match the expected response value, or the correct response is not received in a predetermined period of time, the STB will prevent the reception of service. Thus, the settop box will not function if a foreign or unauthorized HID transmits the code. The method 400 then continues to step 410 and ends.

Figure 5:
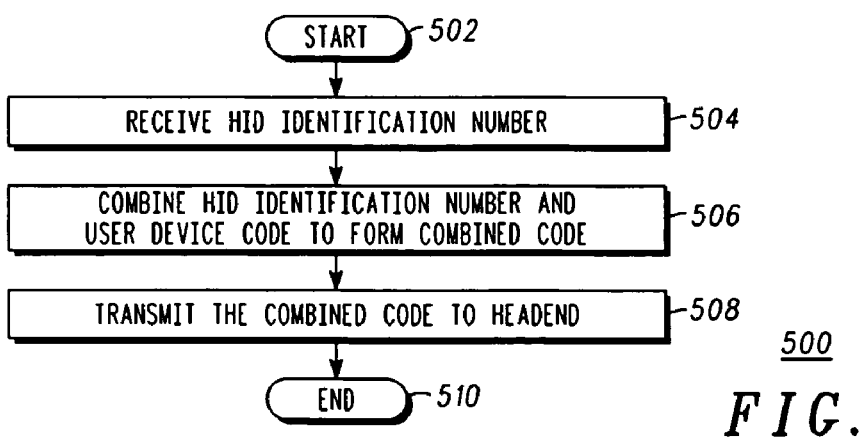
FIG. 5 is a flow diagram of a third method for linking a plurality of devices to a service location in accordance with the present invention.

FIG. 5 depicts a flow diagram of a method 500 executed by one embodiment of the present invention. This embodiment involves the system being configured to function in another bidirectional manner where the HID 214 initially transmits the HID identification number (e.g., a verification signal) to the STBs coupled to HID 214 via the downstream port 216. The method 500 commences at step 502 and proceeds to step 504, where an HID identification number is received. In one embodiment, at least one settop box initially receives an HID identification number from an HID. This HID identification number is unique to that particular HID device.

At step 506, a user device code and the HID identification number are combined to form a combined code. In one embodiment, the settop box generates a combined code by using the previously received HID identification number along with a particular settop ID code (i.e., the user device code), which is unique to that particular settop box. In one embodiment, this combined code may be hashed or cryptographically secured. At step 508, the combined code is transmitted to a headend 110. In one embodiment, the settop box sends the combined code, via the HID, to the HCC 112 that resides in the headend 110. The HCC 112 then processes the combined code and makes a determination of whether a service flow should be provided to the settop box. More specifically, the HCC 112 inspects the combined code to ensure that the HID is properly associated with the particular settop box (i.e., the settop box is in the proper service location and is authorized to function with that particular HID). If the combined code complies with the HCC 112, the transmission of data is allowed. The method 500 then continues to step 510 and ends.

In another embodiment, each settop box executes a timer that requires a specific message from the HCC 112 to keep them in service. In order for the HCC 112 to transmit the requisite message to each STB, the HCC 112 requires that each STB periodically (or on demand) send a unique STB ID code back to the HCC 112 via the HID's upstream port 222 for examination. Examples of the STB ID code may include the HID identification number itself or some other unique STB identifier merged with the HID identification number.

In an alternative embodiment, the STB may send the STB ID code to the HCC 112. The HCC 112 subsequently examines the path the signal traversed through the data receivers in the headend. Although this method would not identify the STB or HID placement to a definitive service location, it would provide the general area (e.g., a small section of a town) in which the STB resides.

Figure 6:
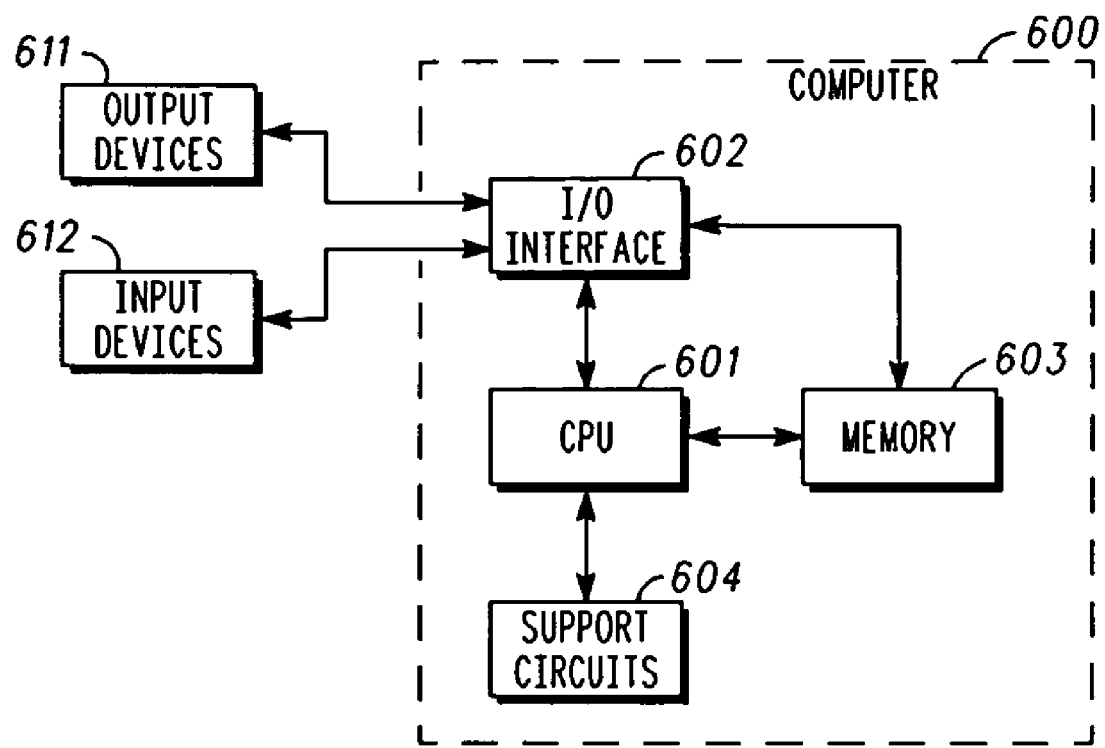
FIG. 6 is a block diagram depicting an exemplary embodiment of a computer suitable for implementing the processes and methods described herein.

FIG. 6 is a block diagram depicting an exemplary embodiment of a computer 600 suitable for implementing the processes and methods described herein. The computer 600 may be used to implement the headend, user device, and/or HID depicted in FIG. 1. The computer 600 includes a central processing unit (CPU) 601, a memory 603, various support circuits 604, and an I/O interface 602. The CPU 601 may be any type of microprocessor known in the art. The support circuits 604 for the CPU 601 include conventional cache, power supplies, clock circuits, data registers, I/O interfaces, and the like. The I/O interface 602 may be directly coupled to the memory 603 or coupled through the CPU 601. The I/O interface 602 may be coupled to various input devices 612 and output devices 611, such as a conventional keyboard, mouse, printer, display, and the like.

The memory 603 may store all or portions of one or more programs and/or data to implement the processes and methods described above. Although one or more aspects of the invention are disclosed as being implemented as a computer (e.g., a settop box, HID, etc.) executing a software program, those skilled in the art will appreciate that the invention may be implemented in hardware, software, or a combination of hardware and software. Such implementations may include a number of processors independently executing various programs and dedicated hardware, such as ASICs.

The computer 600 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 603. The memory 603 may include one or more of the following random access memory, read only memory, magneto-resistive read/write memory, optical read/write memory, cache memory, magnetic read/write memory, and the like, as well as media as described below.

An aspect of the invention is implemented as a program product for use with a computer system. Program(s) of the program product defines functions of embodiments and can be contained on a variety of media, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or hard-disk drive or read/writable CD or read/writable DVD). Such storage media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method for providing a service flow to at least one display device, comprising:
   receiving, by a settop box, a verification signal from a home identification device (HID);
   evaluating, by the settop box, said verification signal for determining whether said service flow is to be provided to said at least one display device associated with the settop box; and
   transmitting a code having an address of the settop box to said HID to be combined with an HID identification number associated with the home identification device to generate said verification signal.

2. The method of claim 1, wherein said verification signal comprises a combined response comprised of said code and said HID identification number.

3. The method of claim 2, wherein said evaluating step comprises:
   providing said service flow to said at least one display device if said combined response is equivalent to at least one match key stored in the settop box.

4. The method of claim 1, wherein said code comprises at least one of: the address of the settop box and an assigned value downloaded from a headend control computer (HCC).

5. The method of claim 1, wherein said service flow is a provisioning of a content stream that comprises at least one of: visual data, audio data, and multimedia data.

6. The method of claim 1, wherein said verification signal comprises a code received from said HID based on the settop box identification number assigned via a configuration code.

7. The method of claim 6, wherein said evaluating step comprises:
providing said service flow to said at least one display device if said code is equivalent to at least one match key.

8. The method of claim 6, wherein said code comprises a unique code from a plurality of unique codes transmitted from said HID.

9. The method of claim 6, wherein said service flow is a provisioning of a content stream that comprises at least one of: visual data, audio data, and multimedia data.

10. The method of claim 7, wherein said at least one match key and said settop box identification number are provided by a headend control computer (HCC).

11. The method of claim 1, wherein said at least one display device comprises at least one of: a television, a monitor, or projector.

12. The method of claim 1, wherein said verification signal comprises a home identification device (HID) identification number.

13. The method of claim 12, wherein said evaluating step comprises:
combining said HID identification number and a settop box code to form a combined code; and
transmitting said combined code to a headend, wherein said headend processes said combined code to determine if a service flow is provided to said at least one display device.

14. The method of claim 13, wherein a headend control computer (HCC) residing in said headend processes said combined code.

15. The method of claim 1, wherein said verification signal is cryptographically secured.

16. The method of claim 14, wherein said HCC provides said service flow to said at least one display device if said combined code indicates a proper association between an HID providing said HID identification code and the settop box providing said settop box code.

17. An apparatus for providing a service flow to at least one display device, comprising:
a settop box for receiving a verification signal from a home identification device (HID); and
the settop box for evaluating said verification signal for determining whether said service flow is to be provided to said at least one display device associated with the settop box, and for transmitting a code having an address of the settop box to said HID to be combined with an HID identification number associated with the home identification device to generate said verification signal.

18. A non-transitory computer readable storage medium including program instructions that instruct a computer to perform a method for providing a service flow to at least one display device, comprising:
receiving a verification signal for a user device from a home identification device (HID);
evaluating, at the user device, said verification signal for determining whether said service flow is to be provided to said at least one display device associated with the user device; and
transmitting a code having an address of the settop box to said HID to be combined with an HID identification number associated with the home identification device to generate said verification signal.

19. A method for providing a service flow to at least one display device, comprising:
receiving, by a home identification device, a service flow from a headend device; and
transmitting, by the home identification device, a verification signal to at least one user device for evaluating, by the at least one user device, said verification signal for determining whether said service flow is to be provided to at least one display device coupled to said at least one user device; and
transmitting a code having an address of the settop box to said HID to be combined with an HID identification number associated with the home identification device to generate said verification signal.

* * * * *